E. J. WILSON.
CLUTCH MECHANISM.
APPLICATION FILED MAR. 21, 1908.
949,559.
Patented Feb. 15, 1910.
2 SHEETS—SHEET 1.
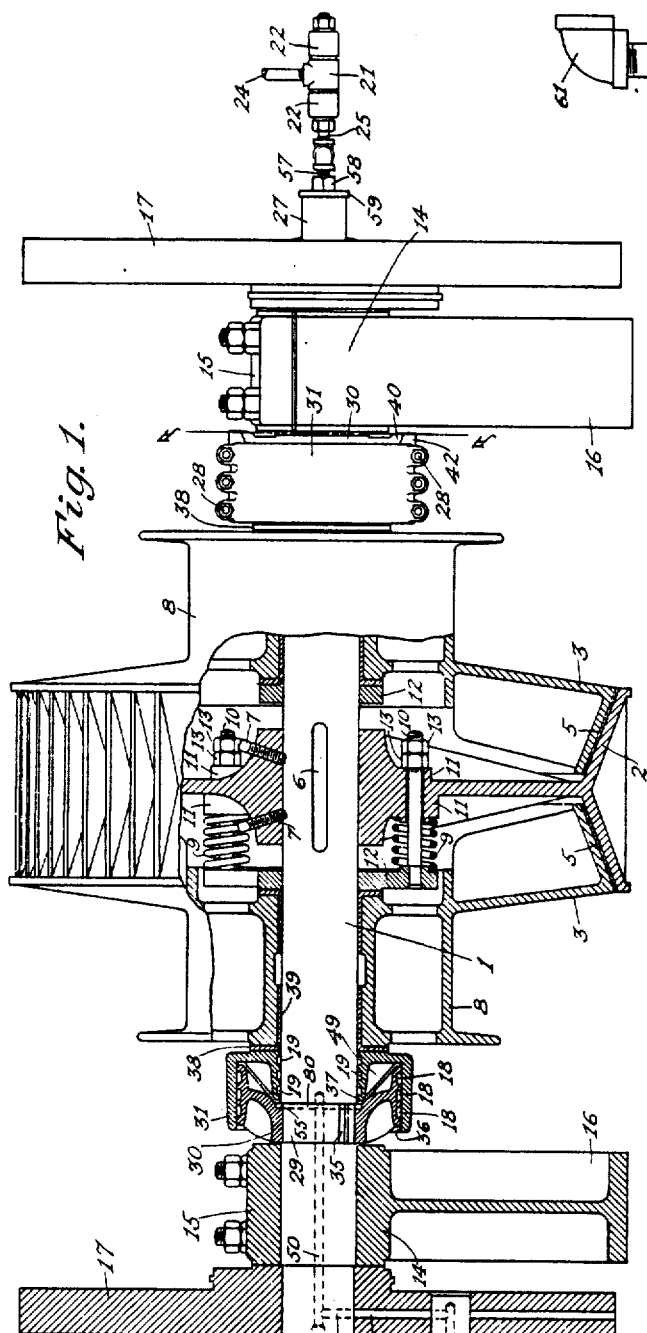
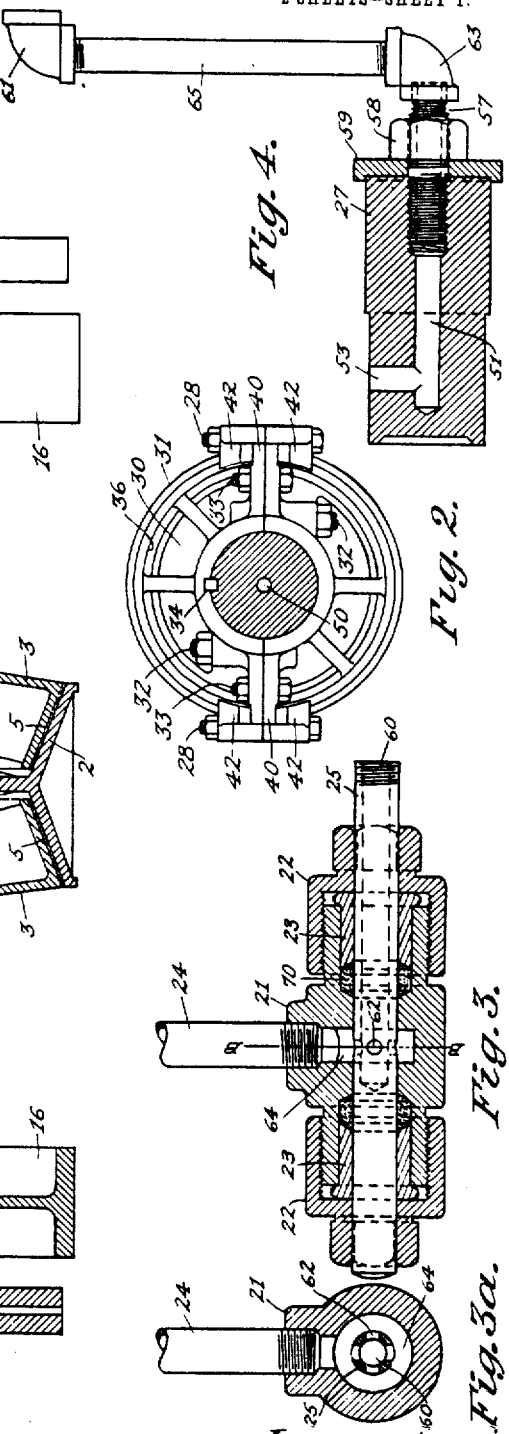
Witnesses:
E. C. Smith
H. H. Knight
Inventor:
Emery J. Wilson
By Knight Bros.
attys E. J. WILSON.
CLUTCH MECHANISM.
APPLICATION FILED MAR. 21, 1908.
949,559.
Patented Feb. 15, 1910.
2 SHEETS—SHEET 2.
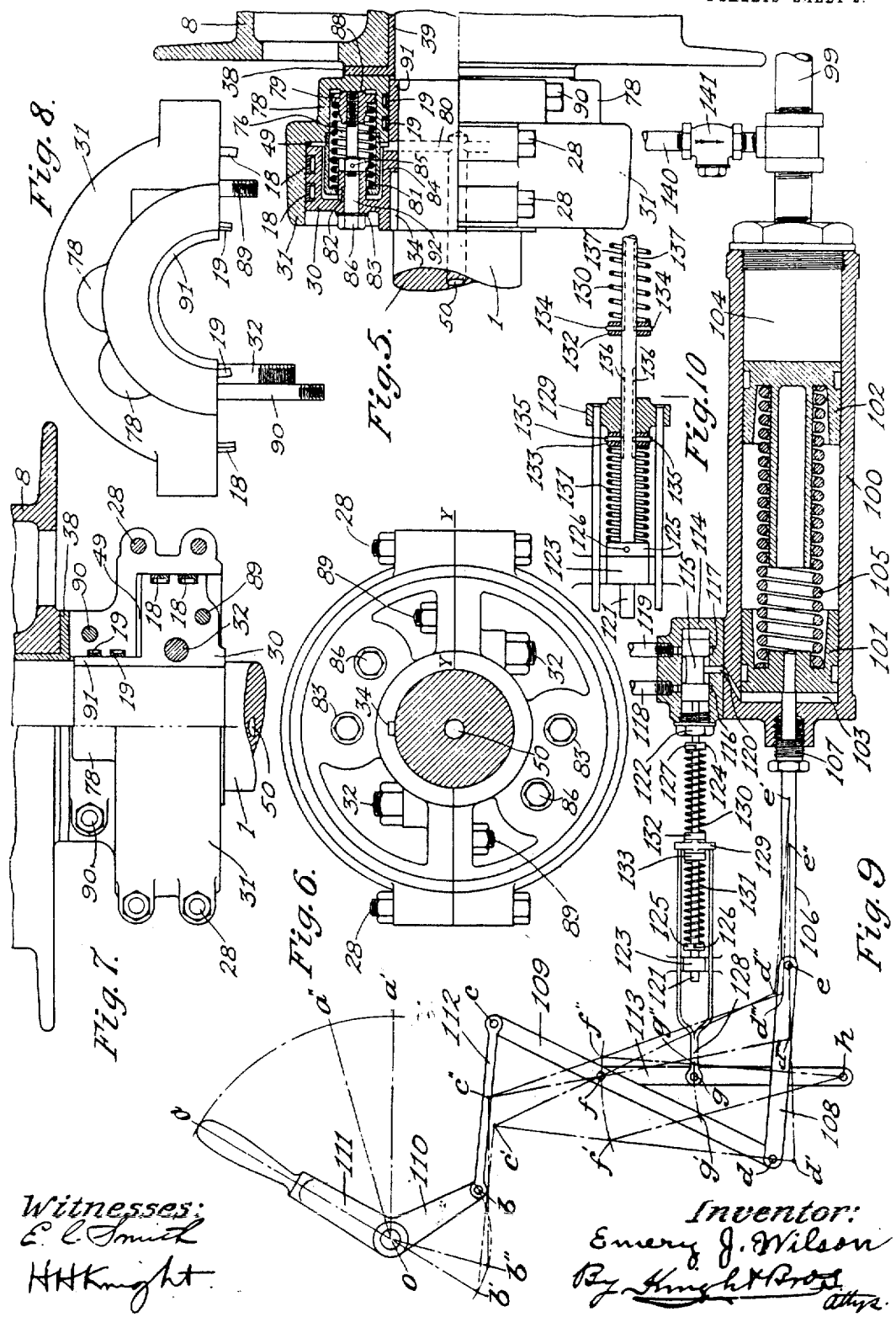

UNITED STATES PATENT OFFICE.

EMERY J. WILSON, OF CAMBRIDGE, MASSACHUSETTS.

CLUTCH MECHANISM.

949,559. Specification of Letters Patent. Patented Feb. 15, 1910.

Application filed March 21, 1908. Serial No. 422,489.

*To all whom it may concern:*

Be it known that I, EMERY J. WILSON, a citizen of the United States, residing at Cambridge, in the county of Middlesex and Commonwealth of Massachusetts, have invented certain new and useful Improvements in Clutch Mechanism, of which the following is a specification.

The invention relates to an improved construction of clutch mechanism actuated by compressed air, steam, or other fluid pressure, which is especially fitted for use in connection with the winding drum mechanism of hoisting and transporting apparatus, although also adapted for use in a great variety of other connections.

In the accompanying drawings, I have illustrated a good form and manner in which the invention may be embodied in reducing the same to practice, and have illustrated sufficient of the winding mechanism, in connection with which the invention is employed, to render clear the application of the invention to such mechanism.

The invention first will be described with reference to the said drawings, and the distinguishing and characteristic features of the invention will be particularly pointed out and distinctly defined in the claims at the close of this specification.

Figure 1 is a view, chiefly in vertical longitudinal section, on a plane passing through the axis of the shaft, but partly in elevation, showing certain portions of a winding mechanism with an embodiment of my invention applied thereto. Fig. 2 is a transverse section, on a larger scale, on the line A—A of Fig. 1, looking from the right hand side thereof, showing the clutch-operating members. Fig. 3 is a view on a still larger scale, chiefly in longitudinal section on the axial line M—M, Fig. 1, but partly in elevation; showing the arrangement of the stuffing-box, supply pipe and transmission rod 25, for supplying the fluid pressure to the clutch operating device. Fig. 3ª is a transverse section of the same, on the line B—B, Figs. 1 and 3. Fig. 4 is a view, chiefly in longitudinal section, showing a means of attachment between the fluid pressure supply pipe and the crank pin, in the case of a direct acting engine, as shown in Fig. 1. Fig. 5 is in part a side view and in part a longitudinal section of the clutch operating members assembled illustrating also the application of supplemental springs between the thrust cylinder and fixed piston-collar, to aid in restoring the parts to retracted position when released from fluid pressure. Fig. 6 is an end view of the same looking from the left side of Fig. 5. Fig. 7 is a view of the same chiefly in plan, but partly in longitudinal section on the line Y—Y, Fig. 6. Fig. 8 is a rear elevation of the upper half of Fig. 6, and shows the upper half of the clutch operating device assembled and ready to bolt to its duplicate lower half in position surrounding the shaft. Fig. 9 is a general arrangement of a fluid pressure controlling device by means of which the clutch may be operated. Fig. 10 is a partial view of the valve stem with its collars, springs, etc., shown in Fig. 9, but drawn to a larger scale to illustrate certain details of its construction as well as to show the relative position of the parts when the valve is in its extreme left hand position.

In Fig. 1; 2 and 3 designate coacting clutch members, the same being constructed to engage with each other for the purpose of enabling one thereof to drive the other. The said clutch members 2 and 3 are designed to be closed together in order to occasion their driving engagement and to be separated in order to effect their disconnection. In the present embodiment of the invention the clutch member 3 is cone-shaped at its periphery, and the clutch member 2 has a correspondingly shaped recess to receive the cone. It is customary in practice to provide for increasing the frictional adhesion of the clutch members 2 and 3 to each other through the employment of some frictional material.

In the drawings, 5 designates a surfacing of leather or the like, which is applied to the periphery of the cone 3.

I have thus far described merely the features of a well-known type of friction clutch. It should be borne in mind that this is only one of the ordinary forms of clutches which are in use and that for the purpose of the present invention any one of a considerable variety of clutches may be substituted in lieu of the form of clutch shown, also that the invention is not wholly restricted to application to friction clutches.

In the present case the clutch member 2 is shown fixed upon a shaft 1, it being connected with the latter by means of a key 6, so as to cause it to rotate with the said shaft and also prevented from having movement endwise thereon by means of screws 7. 7.

Each clutch member 3 is shown mounted concentrically with the said shaft and with capacity to turn independently thereof when the clutch members 2 and 3 are separated from each other, each of said clutch members 3 being herein represented as connected with a winding-drum 8, which in practice receives on its exterior a hoisting rope (not shown). The drawings show a duplicated arrangement of parts on the shaft 1, there being mounted loosely and concentrically with the said shaft two winding-drums 8, 8, each having connected therewith a clutch member 3. The clutch member 2, which is located at mid-length of the shaft and between the two winding-drums, it made double, so as to enable either or both of the clutch members, 3, 3, pertaining to the winding drums 8, 8, to be engaged with the said clutch member 2, as may be required in practice. This duplicated arrangement involves the use of two sets of the clutch devices; but inasmuch as the general arrangement is old in practice and does not enter into the invention, I shall in the following description confine myself to references to the parts of a single set of the devices.

For the purpose of causing the clutch members 2 and 3 to tend to separate, so that when permitted to open the said clutch members normally shall stand separated and out of engagement with each other, I interpose between the same a spring or springs which shall be compressed when the movable clutch member 3 is pressed against the fixed clutch member 2 and which by the tension or elasticity thereof shall bear the clutch member 3 away from the clutch member 2 when permitted to act. Thus in the drawings I have shown two spiral springs 9, 9, employed for the purpose, these springs being mounted upon bolts or pins 10, 10, projecting loosely through holes in the bosses 11, 11, on the fixed clutch member 2 and attached to a collar 12, which last acts against the end of the hub of the movable clutch member 3. Nuts 13, 13, on the face extremity of the pins or bolts 10, 10, limit the extent of the movement of the collar 12 under the action of the springs 9, 9, and prevent the withdrawal of the pins or studs 10, 10, from the bosses 11, 11, of the fixed clutch member.

14, 14, designate the bearings in which the shaft 1 is mounted, the said bearings being provided with caps 15, 15, and supported on suitable framing 16, 16. At each end of the shaft and keyed thereto, as a means for rotating the same, I have shown crank-disks 17, 17, carrying the crank pins 27, 27, to which motive power is applied in any suitable manner, as by means of an engine commonly employed in the like connection. That portion of the shaft which is between the bearing 14 and the adjacent end of the hub of the proximate winding barrel 8, and nearest to the bearing 14 is reduced slightly in diameter as shown at 29 to receive the piston-collar 30. To permit this arrangement said piston-collar is made in halves which are firmly held together and in place, as by the studs 32, 32, and the bolts 33, or by any other suitable means, thus preventing any relative motion between said piston-collar and shaft along the shaft. Further, any rotation of said piston-collar relative to the shaft is prevented by the key 34 which fits into a corresponding key-way 35 in the shaft.

Between the piston-collar and the above mentioned hub of the winding barrel is placed the cylinder 36, 37, which is also made in halves, held firmly together as by the bolts 28, the cylindrical surface 36 of this member being suitably bored to fit the outer cylindrical surface of the piston collar, while the cylindrical surface 37 is suitably bored to fit the corresponding portion of the shaft. The end of the cylinder 36, 37 is in frictional contact with the flange 38 of the bushing 39 which is fast to the drum, the flange thus constituting the above mentioned end of the hub of the winding-drum.

Referring to Figs. 1 and 2, the projections 40, 40, on the piston collar 30 fit into corresponding slots 41, 41, formed by the lugs 42, 42, on the cylinder 36, 37, thus preventing relative rotation both between the piston collar and the cylinder and between the cylinder and the shaft, yet allowing ample freedom of motion of the cylinder relative to both piston collar and shaft axially.

While I have shown and described the piston collar and the cylinder so constructed as to prevent relative rotation between each other and between the cylinder and the shaft, I do not wish to be limited to this form of construction exclusively. The projections 40, 40, on the piston collar, and the lugs 42, 42, on the cylinder may both be omitted, thus allowing both rotation and axial movement of the cylinder relative to both piston collar and shaft.

In order to prevent or reduce leakage of the fluid under pressure between the adjacent cylindrical surfaces of the piston-collar and the cylinder, and between the cylinder and shaft, and yet allow ample freedom of movement of the cylinder relative to both piston-collar and shaft, packing rings 18 and 19, shown in Figs. 1 and 5 are used.

For the purpose of transmitting fluid pressure to the space 49 between the piston collar and the cylinder the shaft 1 and the crank pin 27 are drilled part-way along their axes by the holes 50 and 51 and radially by the holes 52 and 53 respectively, the radial holes and axial holes thus joining as shown. The crank disk 17 is also drilled by a hole 54 to join the holes 52 and 53. The shaft is further drilled by one or more holes 80 which communicate with the space 49 through suitable corresponding notches or openings 55 in the hub of the piston-collar. The outer end of the hole 50 in the shaft is tapped to receive a flush plug 56 and the outer end of the hole 51 in the crank pin is tapped to receive a hollow stud 57 which is furnished with a nut 58 for holding the removable cap 59 in place on the crank pin as may be required. A supply pipe 24 is tapped into an interior open space 64 of a double ended stuffing box 21 which is provided with caps 22, 22, glands 23, 23 and packing material 70, 70, surrounding a transmission rod 25, as is common in practice to prevent leakage. The transmission rod is drilled or otherwise made tubular, for a portion of its length by a hole 60, the open end of the rod being threaded to receive an elbow 61. The rod is further drilled by one or more holes 62 which establish communication between the hole 60 and the interior space 64 of the stuffing box, said space entirely surrounding the rod so that the communication is unbroken during the rotation of the rod 25 in the stuffing-box 21.

It is evident by the above described arrangement that any unbalanced end thrust of the rod due to the fluid under pressure is eliminated. The end of the stud 57 is threaded to receive an elbow 63 and a pipe 65 connects the elbows 61 and 63, thus completing the communication between the supply pipe 24 and the previously mentioned space 49 between the piston collar and the cylinder. The transmission pipe 25 rotates in the stuffing-box 21 and collars 22 on an axis in line with that of the main shaft 1, so that the stuffing-box 21 with its attachments may be held stationary in fixed supports while the connecting pipe 65 and the elbows 61, 63 connected respectively to the transmission pipe 25 and crank pin 27 are carried by the latter in its revolution.

The above described method of transmitting pressure through the crank pin is exemplified to show its possibilities in the case of a direct acting engine. When permissible, as for example, if the shaft were driven by a gear in place of the crank disks as shown, the threaded end of the transmission rod 25 could be screwed directly into the tapped end of the hole 50 in the shaft.

The operation of the clutch, therefore, is effected as follows: The supply of fluid pressure to the supply pipe 24 is controlled by a suitable valve and transmitted to the space 49 between the piston collar and cylinder as previously described, thus moving the cylinder axially along the shaft, the reactionary force being resisted by the piston-collar which is fixed on the shaft. The end of the cylinder being in frictional contact with the hub of the winding drum 8, its lateral movement is thereby transmitted to the movable clutch member 3 and the latter is forced against the fixed clutch member 2. When the adhesion between the two clutch members is sufficiently great to cause them to turn together so that there is no motion of the one relative to the other, it is evident from the nature of the construction that there will be no relative motion and consequent friction between the hub of the winding drum and the end of the cylinder, therefore the whole system constituting the clutch members and the clutch operating device turns as a unit. It is further evident from the nature of the construction that there is no end thrust in the bearings, the force exerted upon the fixed clutch member 2 being counterbalanced or neutralized in the shaft by the equal and opposite reactionary force on the piston-collar, so that the whole system above mentioned is self-contained. Sometimes it becomes necessary in practice to repair or replace the frictional surfacing material of the clutch members, or for other reasons it becomes necessary to separate the said clutch members completely from each other. This is readily made possible by removing the cylinder and piston collar with their accompanying packing rings said members being made in halves as previously described. The separable and removable construction may be secured in other ways than that shown in the drawings. After the removal of said members the winding drum and clutch member 3 may be moved along the shaft as far as the bearing 14. After they have been restored to their working position by a reverse movement of the same upon the shaft 1, the clutch operating device members may be reapplied and secured in place.

In the clutch operating device thus far described the movable clutch operating member 31 is forced against the movable clutch member 3 by the action of a fluid pressure exerted between said member 31 and the fixed resistance collar 30, while the force of the springs 9, exerted between the fixed and movable clutch members, is relied upon to restore the member 31 to its initial position when the fluid pressure is released. The friction between the fixed and movable clutch operating members 30 and 31 with their packing rings, the resistance of the fluid flowing through its passages and the inertia of the movable clutch operating member itself necessitate an increased pressure with consequent increased friction between the bushing 38 and the member 31 when the clutch member 3 is allowed to rotate upon the shaft during a partial release or a partial application of the clutch. In order to eliminate as far as possible this friction between the members 31 and 38 and at the same time make the clutch operating device quicker and more positive in its release. I use a spring, or a combination of springs, the force of which is exerted between the fixed and movable clutch operating members tending to draw the member 31 away from the movable clutch member 3 when the fluid pressure is released, and restore said member 31 to its initial position relative to the resistance collar 30.

In Figs. 5, 6, 7 and 8 I have shown means of using four helical compression springs 76 symmetrically arranged in diametrically opposite pairs, the axes of the springs lying parallel to the axis of the shaft. The upper and lower halves of the device are assembled separately, the several members of each half being so held together as to form a single unit.

Referring to the arrangement of a single spring shown in section in Fig. 5, the movable clutch operating member is provided with a cylindrical recess or pocket 78 to receive a nut 79 against which one end of the spring bears. The opposite end of the spring is confined in a cap 81 which is screwed into the mouth of the pocket 78 thus confining the spring and compressing it between the nut 79 and the inside top surface of the cap. The fixed clutch operating member 30 has a suitable corresponding recess to receive said cap while the cylindrical boss 82 on the inside of member 30 projects loosely through the top of the cap and inside the helical spring. The bolt 92 passes snugly through the boss 82 and is held in position by the nut 84 which is held in place on the bolt by a pin 85, while a gasket or suitable packing material 83 is placed between the head of the bolt and the outside surface of the fixed member 30 to further prevent leakage. Turning the bolt by means of a wrench applied to the head 86 screws the threaded end of the bolt into the nut 79 thus drawing the members 30 and 31 together. The positions of the parts as drawn show the clutch operating members in the retracted or off position. When fluid pressure is exerted between the members 30 and 31 the member 31 is forced to the right, and the nut 79 being held fixed relatively to the fixed member 30, the spring 76 is compressed, and the force of the spring thus exerted between the nut 79 and the cap 81 serves to restore the member 31 to its original position when the fluid pressure is released.

As the frictional surfacing 5 (Fig. 1) between the fixed and movable clutch members 2 and 3 wears away, it is advantageous to limit the motion of the movable clutch member 31 so that it may not be moved under the action of the springs 76 more than the amount necessary to release the clutch. This adjustment is made possible by the construction shown. Unscrewing the bolt 92 from the nut 79 advances the nut relative to the fixed member 30, the face of the nut serving the further purpose of a stop to limit the return motion of the member 30.

Figs. 5, 7 and 8 show a further modification in the construction of the clutch operating members 30 and 31. The inner cylindrical surface of the movable member 31 is suitably bored to fit the outer cylindrical surface of the hub extension 91 of the fixed member 30, the shaft 1 being reduced slightly in diameter for a sufficient length to receive said hub with extension. As before the packing rings 18, 18, 19, 19, prevent or reduce leakage between the adjacent cylindrical surfaces of the fixed and movable members; and the upper and lower halves of the fixed member are held together in position surrounding the shaft by the studs 32, 32, 89, 89, while the upper and lower halves of the movable member are united by the bolts 28 and the studs 90.

In the operation of a clutch mechanism of the class described, it is desirable to vary the pressure between the two clutch members so as to permit of a partial application or a partial release of the same.

Figs. 9 and 10 show a means for regulating and varying the fluid pressure exerted between the two clutch operating members 30 and 31, and making the said pressure automatically dependent upon the position of an operating lever. An incompressible fluid or liquid such as oil which completely fills the space 49 between the fixed and movable clutch operating members 30 and 31, as well as all the passages which connect said space 49 with a suitable pressure chamber 104, is used as a medium for transmitting the pressure, while an expansive fluid such as steam is used for producing said pressure, the action of the steam being regulated as hereinafter described, resulting in the desired variations of pressure between the clutch members.

The device as shown consists of a cylinder 100 containing two pistons 101 and 102, with a helical compression spring 105 between them the force of which tends to keep the pistons apart. The force exerted by the spring upon the piston 102 is exerted upon the oil in the pressure chamber 104 which chamber is in communication with the clutch operating device through the outlet pipe 99. Steam which is admitted to the steam space 103 acts upon the piston 101 and the translation of the piston 101 relative to the piston 102 is a measure of the force exerted upon the piston 102 due to the compression of the spring 105.

The steam piston 101 is provided with a piston rod 106 which passes through the packing nut 107 at the steam end of the cylinder. The link 108 connects the end $e$ of the piston rod to the end $d$ of the floating lever 109 while the opposite end $c$ of the floating lever is connected at $b$ to the arm 110 of the operating lever 111 by a connecting rod 112, said operating lever having a fixed fulcrum at $o$. The floating lever 109 is pivoted at $f$ to the end of a lever 113 which has a fixed fulcrum at $h$.

The steam chest 114 contains a piston valve 115 shown in the central position covering both the steam port 116 and exhaust port 117, said ports being in communication with the supply pipe 118 and exhaust 119 respectively. The central port 120 connects with the steam space 103 of the cylinder as shown so that when the valve is moved to the left of its central position steam passes from the supply pipe 118 through the ports 116 and 120 to the steam space 103, and when the valve is moved to the right of its central position steam is exhausted from the steam space 103 through the ports 120 and 117 to the exhaust pipe 119. The valve is moved by the valve stem 121 which passes through the steam chest cap 122 and has a fixed outboard bearing at 123. Collars 124 and 125 are fixed to the valve stem as by means of pins 126 and 127 so that the motion of the valve to the right or left is limited by the collars 124 and 125 coming into contact with the cap 122 and bearing 123 respectively. The forked connection 128 is joined to the lever 113 at $g$ while its forked end carries a yoke 129, said yoke being free to move along the valve stem in either direction.

Compression springs 130 and 131 bearing against the fixed collars 124 and 125, act upon movable collars 132 and 133 whose respective motions relative to the valve stem to the left and right of the positions as shown in Fig. 9 are prevented by means of projecting pins 134 and 135 which come into contact with the ends of the valve stem grooves 137 and 136 in which the pins slide. The springs are sufficiently strong to resist compression so that the yoke and valve move in unison until the limit of motion of the valve is reached when one or the other of said springs is compressed by the excess motion of the yoke, the corresponding collar sliding along the valve stem, the valve meanwhile being held firmly in its corresponding extreme position by the reaction of said spring. By this construction the action of the valve may be made extremely sensitive to the motion of the piston 101 while its proportions and travel are kept within practical limits.

In order to compensate for possible leakage of oil in the clutch operating device or passages leading thereto, I have shown a branch pipe 140 by which oil is supplied from a suitable reservoir and fed into the main line 99 through a check valve 141, said supply being under sufficient pressure, as by gravity, to force the pistons 101 and 102 to their initial positions when the steam pressure is released, thus insuring a full pressure chamber 104 at the beginning of each stroke. The effect of said supply pressure upon the clutch operating member 31 is more than offset by the force of the springs 9 between the clutch members, or the springs 76 between the clutch operating members 30 and 31.

The operation of the clutch is therefore as follows:—To apply the clutch the operating lever 111 is moved from the position $o\ a$ to the position $o\ a'$. Assuming the piston 101 to have remained stationary during this change of position of the operating lever, the linkage assumes the position $b'\ c'\ d'\ e\ f'\ g'\ h$. The motion of the point $g$ to $g'$ moves the yoke 129 to the left and thereby holds the valve in its extreme left position as previously described, thus admitting steam back of the piston 101. The motion of the piston 101 to the right under the pressure of the steam will continue until the linkage assumes the position $b'\ c'\ d''\ e'\ f\ g\ h$, when the valve is restored to its neutral position and the supply of steam is cut off. The motion of the piston 101 results in a corresponding motion of the piston 102 together with a compression of the spring 105, the amount of spring compression determining the pressure which the piston 102 exerts upon the oil. It is evident then that for every position of the operating lever there is a corresponding self determined position of the piston 101 and therefore a corresponding pressure exerted upon the oil by the piston 102 due to the compression of the spring 105.

When a reduction of pressure is desired the operating lever is lifted, for example from the position $o\ a'$ to the position $o\ a''$. As before, assuming the piston 101 stationary during the operation the linkage assumes the position $b''\ c''\ d'''\ e'\ f''\ g''$, $h$, and the motion of the point $g$ from $g'$ to $g''$ moves the valve to the right thus uncovering the port 117 and permitting the steam to pass from the space 103 to the exhaust pipe 119. The steam pressure back of the piston 101 being reduced, the spring 105 forces the piston 101 to the left until the linkage assumes the position $b''\ c''\ d''''\ e''\ f\ g\ h$, when the valve is again restored to its neutral position and the exhaust of steam is cut off. Hence in general a movement of the operating lever in one direction results in an increase of pressure in the fluid which operates the clutch, while a movement in the opposite direction results in a decrease of said pressure, and said variation of pressure is automatically dependent upon the position of the operating lever.

My invention in its broader features may be embodied in either a direct acting or a geared engine and may be carried into effect with a clutch operating member having either a simple axial movement or capable of both axial and rotary movements relatively to the fixed resistance collar.

What I claim is:

1. In a fluid pressure clutch operating apparatus of the class described, the combination of a shaft and means for rotating it in suitable bearings or supports through which the shaft passes, a fixed double-clutch member fast on said shaft, separate movable clutch members mounted concentrically on the said shaft adjacent to the respective faces of the fixed double clutch-member, adapted to coöperate therewith and capable of independent rotary and axial movement, fixed resistance collars mounted on the shaft on each side of the said clutch members, movable clutch operating members mounted concentrically on the shaft between the fixed resistance collars and the movable clutch members so as to coöperate therewith, means for confining pressure fluid between the respective fixed resistance collars and clutch operating members, separate means for transmitting fluid pressure to the respective chambers between the fixed resistance collars and clutch operating members, means for controlling said fluid pressure independently so as to shift either of the said movable clutch members into operative engagement with the fixed clutch member and one or more springs or systems of springs on either side of the central fixed clutch member, operating to restore the parts to initial relative positions when the fluid pressure is released.

2. In a fluid pressure actuated clutch-mechanism, the combination of a rotary shaft, fixed and movable clutch members mounted concentrically on said shaft, a resistance collar fixed concentrically on said shaft, a movable clutch operating member interposed between the fixed resistance collar and movable clutch member so related to the fixed resistance collar as to provide a fluid pressure chamber between them and adapted to force the movable clutch member into operative engagement with the fixed clutch member by the agency of such fluid pressure, a suitable crank for rotating said shaft, having a hollow crank-pin connected by suitable passages with the fluid pressure chamber, a fixed source of fluid-pressure supply, a rotating pipe connected therewith, in line with the axis of the main shaft and a suitable connection from said axial pipe to the hollow crank pin, to transmit fluid pressure therethrough and thence to the chamber in the clutch operating member.

3. In a fluid pressure actuated clutch mechanism, the combination with a shaft and bearing in which the shaft turns, of a fixed clutch member and a fixed resistance collar, both mounted concentrically on said shaft; a movable clutch member mounted concentrically on said shaft adjacent to said fixed clutch member and capable both of rotary and axial movements relative to said shaft; a movable clutch operating member mounted concentrically upon said shaft between said movable clutch member and said resistance collar and coöperating with the latter to confine fluid pressure between them, means for applying fluid pressure between said movable clutch operating member and said fixed resistance collar thereby to force the movable clutch member into contact with the fixed clutch member; a spring or combination of springs so placed as to exert a force between the fixed resistance collar and the movable clutch operating member in opposition to the force exerted by the fluid pressure and means for adjusting and limiting the motion of the movable clutch operating member relative to the fixed resistance collar; all of the above mentioned members being situated on the same side of said bearing.

4. In a fluid pressure clutch operating device consisting of a fixed resistance collar and an axially movable fluid pressure cylinder both mounted concentrically upon said shaft and coöperating to confine fluid between each other, a combination of springs exerting a force between said resistance collar and cylinder in opposition to that exerted by the fluid pressure, said device in its entirety being separated into two parts, the several members of each part being held together as a single unit, and means for fixing the said two parts together in operative connection with the shaft, substantially as described.

5. In a fluid pressure clutch operating apparatus, the combination of a fixed clutch member, a revolving shaft on which it is mounted, a resistance collar fixed on same shaft, a movable clutch member on same shaft adjacent to the fixed clutch member and capable of rotary and longitudinal motion relatively thereto, a clutch operating member coöperating with the fixed resistance collar so as to confine fluid pressure between them, means for supplying such fluid pressure, a spring or system of springs between the fixed and movable clutch members to restore the latter to initial position when the fluid pressure is released and a supplemental system of springs interposed between the fixed resistance collar and clutch operating member to assist in restoring the latter to initial position.

6. In a fluid pressure operated clutch mechanism of the character described, the combination with clutch operating means adapted to be controlled by fluid under pressure, and means for conducting said fluid to said clutch operating means; of a cylinder, a yielding piston in said cylinder dividing it into two compartments, one of said compartments containing the clutch operating pressure fluid, the other compartment adapted to receive fluid under pressure for operating said piston, a slide valve and a hand lever for operating said valve to control said piston operating fluid, said piston operatively connected with said slide valve to cause said valve to automatically admit to or release pressure fluid from said piston according to the relative position of said piston and said hand lever.

7. In a fluid pressure operated clutch mechanism of the character described, the combination with clutch operating means adapted to be controlled by fluid under pressure and means for conducting said fluid to said clutch operating means; of a cylinder, a double piston in said cylinder having a spring between its two members and dividing said cylinder into two compartments, one of said compartments containing the clutch operating pressure fluid, the other compartment adapted to receive a suitable fluid under pressure for operating said piston, a slide valve and a hand lever for operating said valve to control said piston operating fluid, a link movement connecting said piston with said slide valve and said hand lever to cause said valve to automatically admit to or release piston operating fluid from said piston according to the relative position of said piston and said hand lever.

EMERY J. WILSON.

Witnesses:
B. G. MACKINTIRE,
ARTHUR L. WOODMAN.